Nov. 12, 1940.  W. D. FOSTER  2,220,997
APPARATUS FOR FEEDING MATERIAL
Filed Jan. 15, 1934  6 Sheets-Sheet 3

INVENTOR.
BY Warren Dunham Foster
ATTORNEY.

Nov. 12, 1940.  W. D. FOSTER  2,220,997
APPARATUS FOR FEEDING MATERIAL
Filed Jan. 15, 1934    6 Sheets-Sheet 4
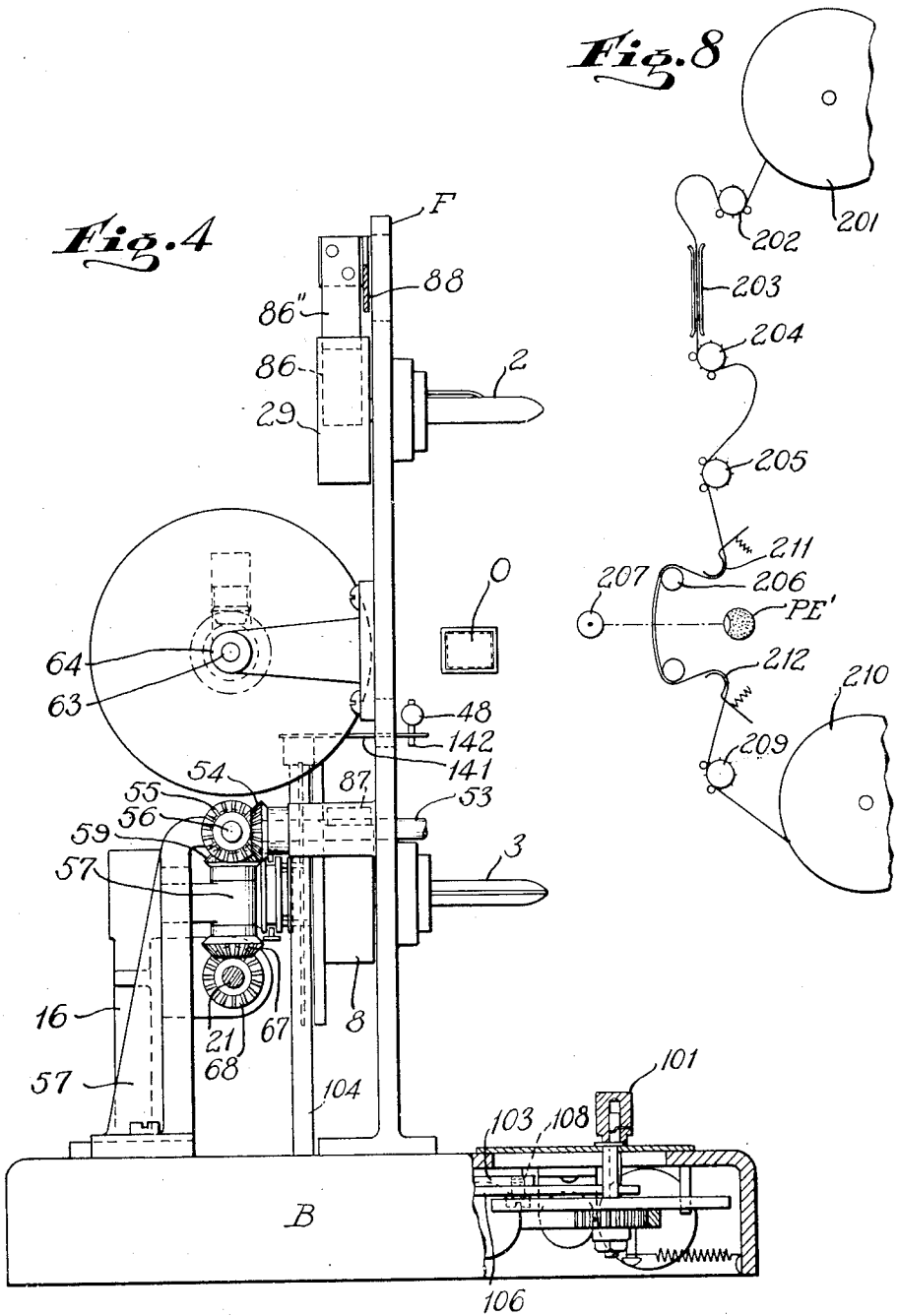

Nov. 12, 1940.  W. D. FOSTER  2,220,997
APPARATUS FOR FEEDING MATERIAL
Filed Jan. 15, 1934    6 Sheets—Sheet 5
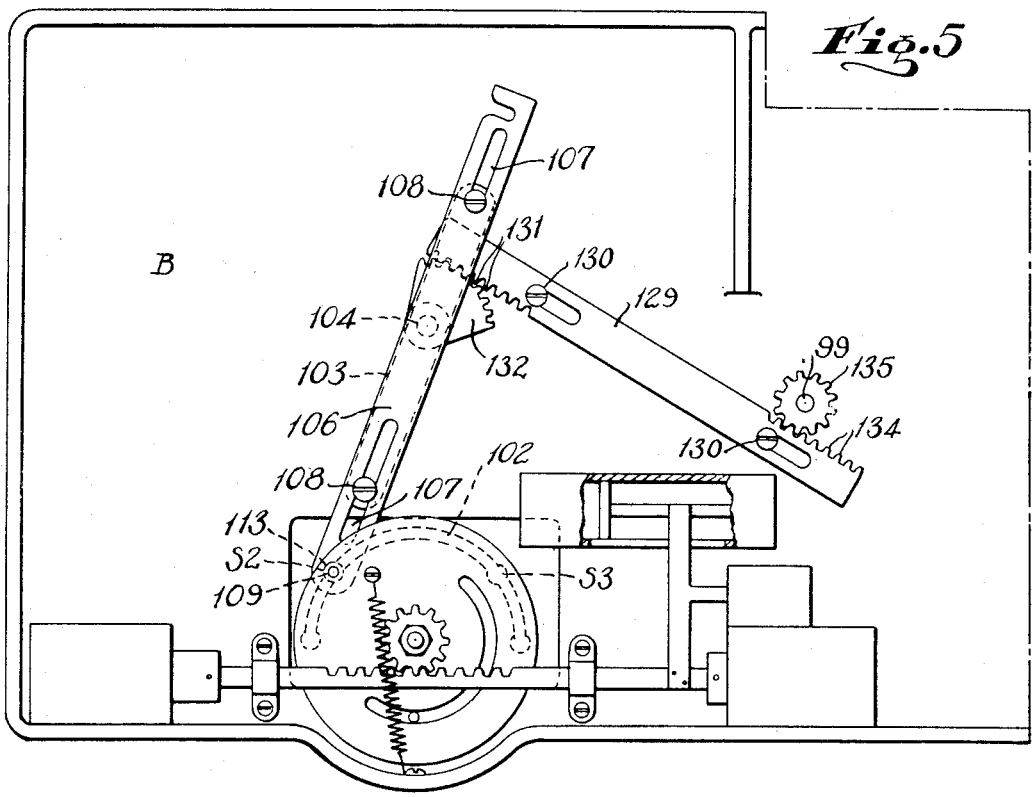
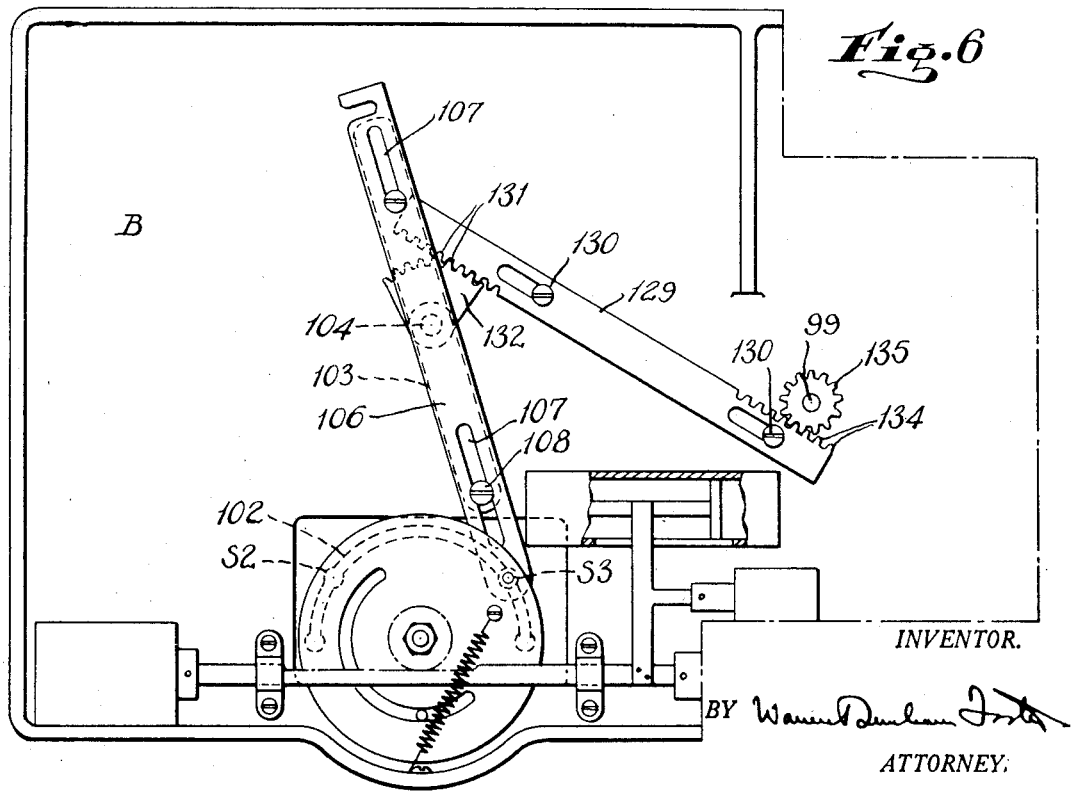
INVENTOR.
BY Warren Dunham Foster
ATTORNEY.

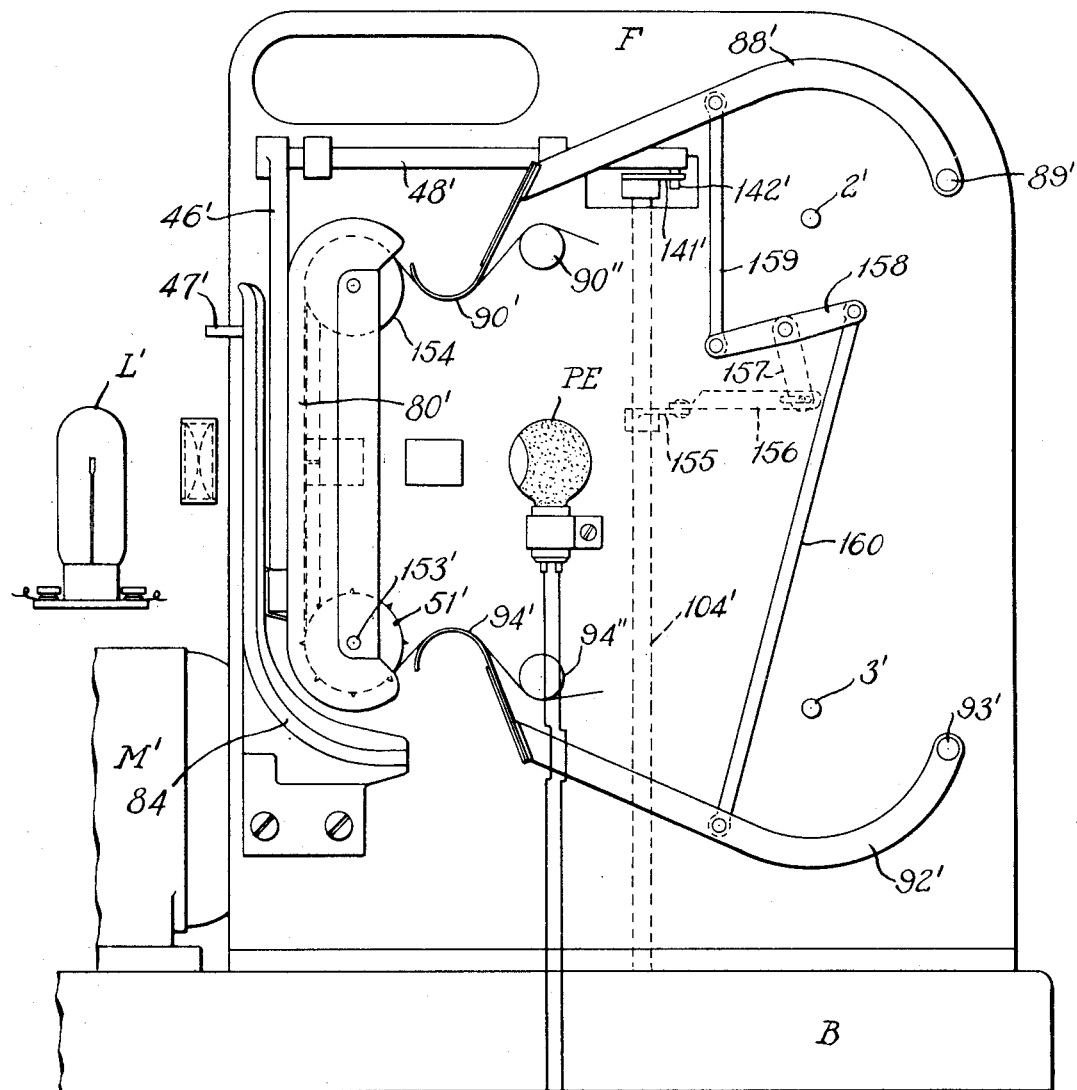

Patented Nov. 12, 1940

2,220,997

UNITED STATES PATENT OFFICE 2,220,997

APPARATUS FOR FEEDING MATERIAL

Warren Dunham Foster, Washington Township, Bergen County, N. J., assignor to Kinatome Patents Corporation, Ridgewood, N. J., a corporation of New York Application January 15, 1934, Serial No. 706,768

20 Claims. (Cl. 88—16.8)

The present invention relates broadly to an improved apparatus for feeding material, particularly in connection with the continuous feeding of film bearing thereupon pictorial images or images representing sound, or a combination of such images, or for the exposure to or printing of such images, although the utility of the invention is not limited in this respect.

This application is a continuation in part of my co-pending application Serial Number 57,392, filed September 19, 1925. In said co-pending parent application, I stated that the control for film-feeding therein described tends to produce a uniform film feed, and is adaptable to apparatus of the well known type utilizing prisms instead of a shutter for projection or photographic purposes. I stated that in such cases the tension control insures the required synchronization and registration of successive pictures.

A primary object of the present invention is to describe means whereby the tension control system of feeding as stated above is applied to a continuously moving film in order to secure the required synchronization and uniform movement of the film. It will be readily understood by those skilled in the art that my invention would apply to any device in which such uniform movement is required as, for example, the type of projection or photography known as "optical rectification", a film printer of the continuous type, a film playing phonograph, a sound head, or other apparatus for reproduction or recordation of images representing sound, whether alone or in combination with pictorial images. It is known that it is difficult to secure such regular movement without special devices, and this tension control system of feeding applied to a continuously operating member secures the required evenness and regularity of movement. Another object of the invention is to provide apparatus for the control of the devices which secure this required uniform movement, either alone, or in combination with other operable elements of an apparatus. In apparatus of this sort the "ripple-killing" mechanism is automatically rendered operative and inoperative upon the film in timed or other desired relation to the opening and closing of the gate or the operation of the presser member or to the control of the other operable elements of the apparatus, such as the feeding mechanism, or sound head, or exciter lamp or motor, thus enabling a person unskilled in the operation of the film-handling apparatus quickly and easily to place the film in full operative relation with the apparatus and to remove it therefrom, and also enabling an expert operator to save time and trouble and to secure more effective results.

The apparatus described and claimed herein is equally applicable to professional use in theatres or to use in the home.

Other features and advantages of the present invention will be apparent from the following specification and the drawings constituting a part thereof, for the purpose of illustration only of certain preferred embodiments of my invention in which changes can readily be made in respect both to construction and operation without departing either from the spirit of my invention or the scope of my broader claims.

In the drawings, Figure 1 is the right side of the machine, the lamp housing and certain other parts being broken away, this figure showing my invention as applied to apparatus in which the continuous movement of the film is for the purpose of presenting pictorial images by the process known as optical rectification.

Figure 4 is a partial view taken on line 4—4 of Figure 1 looking in the direction of the arrows.

Figure 5 is a partial bottom plan view showing the actuating mechanism in running or operative position.

Figure 6 is a partial bottom plan view showing the actuating mechanism in film-threading or preliminary position.

Figure 7 is a right-side elevation of a preferred modification of my invention showing my invention applied to apparatus for the reproduction of sound.

Figure 8 is a diagrammatic view showing my invention applied to a sound head, past which a film is continuously moved, the film being projected intermittently at a picture gate.

In carrying out the present invention there may be provided an apparatus comprising a supporting base B having mounted thereupon a housing, not shown, containing a light source L, and a supporting frame F upon which are mounted the operating parts of the film handling apparatus per se.

Preferably carried by frame F and projecting laterally from one side thereof in predetermined spaced parallel relation is a pair of carrier receiving spindles 2 and 3, the upper spindle 2 being adapted for the holding of a reel of film during delivery thereof while the lower spindle is adapted to be driven simultaneously with the feeding movement for coiling or taking up the film as required. The spindle 2 may also be driven in a contrary direction during the rewinding operation, as taught in my parent application.

Figure 1:
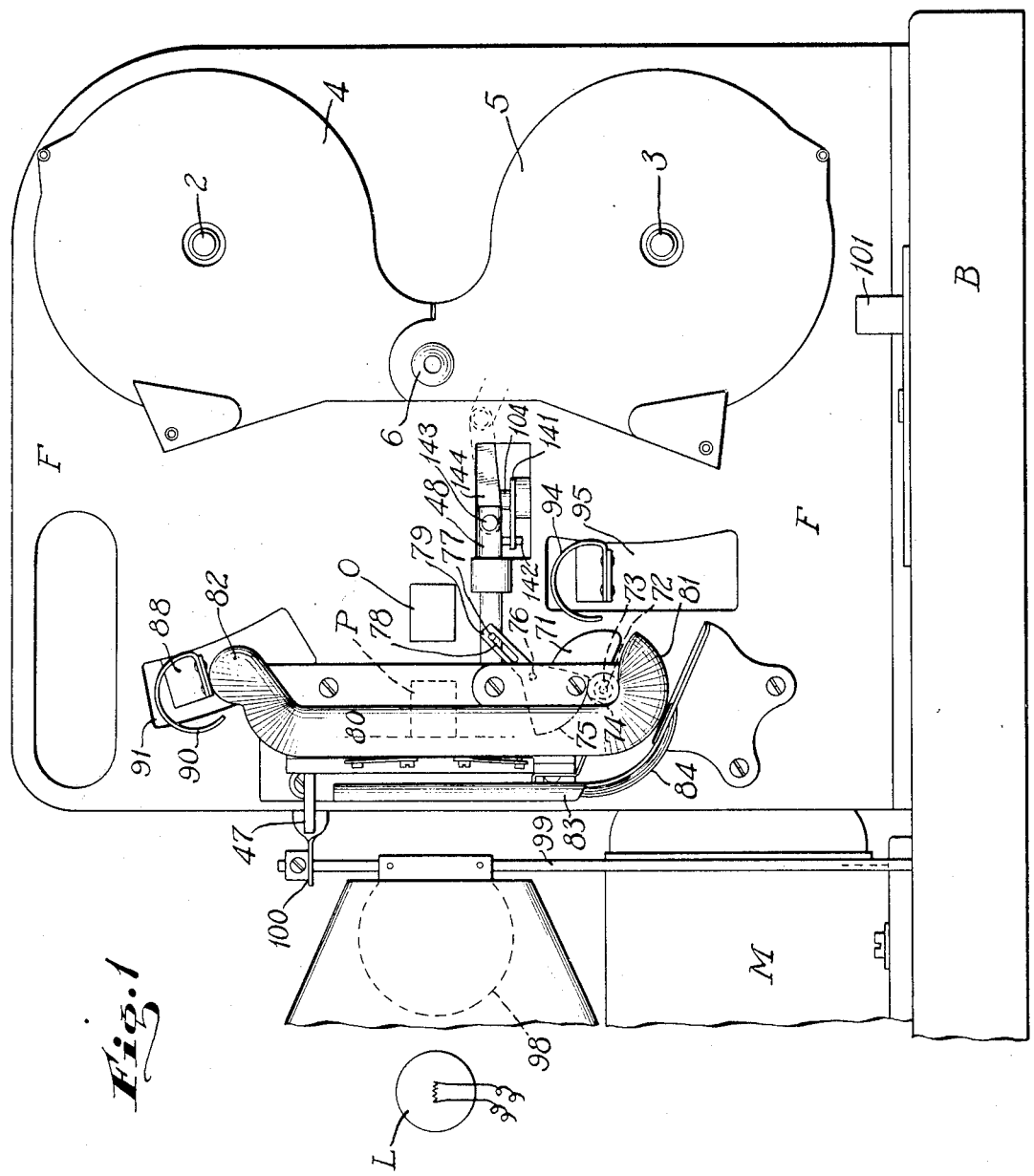

For the purpose of illustration only in Figure 1 I am showing my invention as applied to film handling apparatus in which the film is fed from a delivery spindle 2 to a take up spindle 3 without intermediate continuously operating toothed sprockets. It must be understood, however, that my invention is equally applicable to apparatus in which the film is fed from a continuous delivery to a continuous taking up sprocket or other toothed feeding member with a continuously operating toothed member positioned therebetween or between two continuously driven toothed feeding members as will more fully appear hereinafter.

The film itself is preferably carried in a combined storage and exhibiting protector comprising a pair of containers 4 and 5 having a pivotal connection 6 whereby the containers may be readily separated as shown in Figure 1 to a predetermined extent to expose the desired length of film therebetween or may be rotated in a contrary direction to an adjacent and cooperative position to protect such length of film for storage or shipment. This construction may be substantially such as that described and claimed in the United States Patent Number 1,440,173 granted December 26, 1922, to Herbert George Ponting and George William Ford or may be of any other desired construction.

The lower spindle 3, which will hereafter be referred to as the taking up spindle, is journaled for rotation in a suitable bearing 7 in the frame F. One side of the frame is preferably formed with an enlarged boss 7a through which the spindle extends. Upon the other side of the frame, as clearly shown in Figure 2 of the drawings, a brake drum 8 is secured to the spindle. The spindle 3 is driven in any desired manner, preferably through friction discs as shown in my co-pending parent application.

The take-up or driving spindle 3, if desired, may be controlled by an individual clutch as described in my co-pending parent application, but for purposes of simplicity in illustrating the improvement thereover exemplified in this application, I am showing the driven members of the apparatus as all controlled by one clutch.

Projecting upwardly from the base B in spaced relation to the frame F is a bearing bracket 16 supporting a bearing 18 for the shaft 3 to which is attached a worm wheel 19 adapted to be driven by a worm 20 secured to a horizontally positioned main driving shaft 21 positioned in the rear of the frame F. At its forward end this shaft is mounted in spaced bearings 22, carried by the bracket 16, and is connected to a driving motor M by a clutch later to be described in detail. By reason of this mechanism it will be apparent that when the motor M is operated, the shaft 18 will be positively driven through the above described worm and wheel. Any desired form of clutch may be used between the motor M and the shaft 21 as for example, one which includes a driven cone member 23, mounted upon the right hand portion of the shaft 21 as viewed in Figure 2 of the drawings, and a cooperating concave clutch member 24 secured for rotation with a flexible coupling 25 which is driven by the motor M. A collar 27 attached to the cone 23 is movable by the link 28 with the main control rod later described.

The spindle 2 which will hereinafter be designated as the delivery spindle is mounted similarly to the driving spindle 3 in operating 28 carried by frame F and may have secured to its rear end a brake drum 29.

Figure 3:
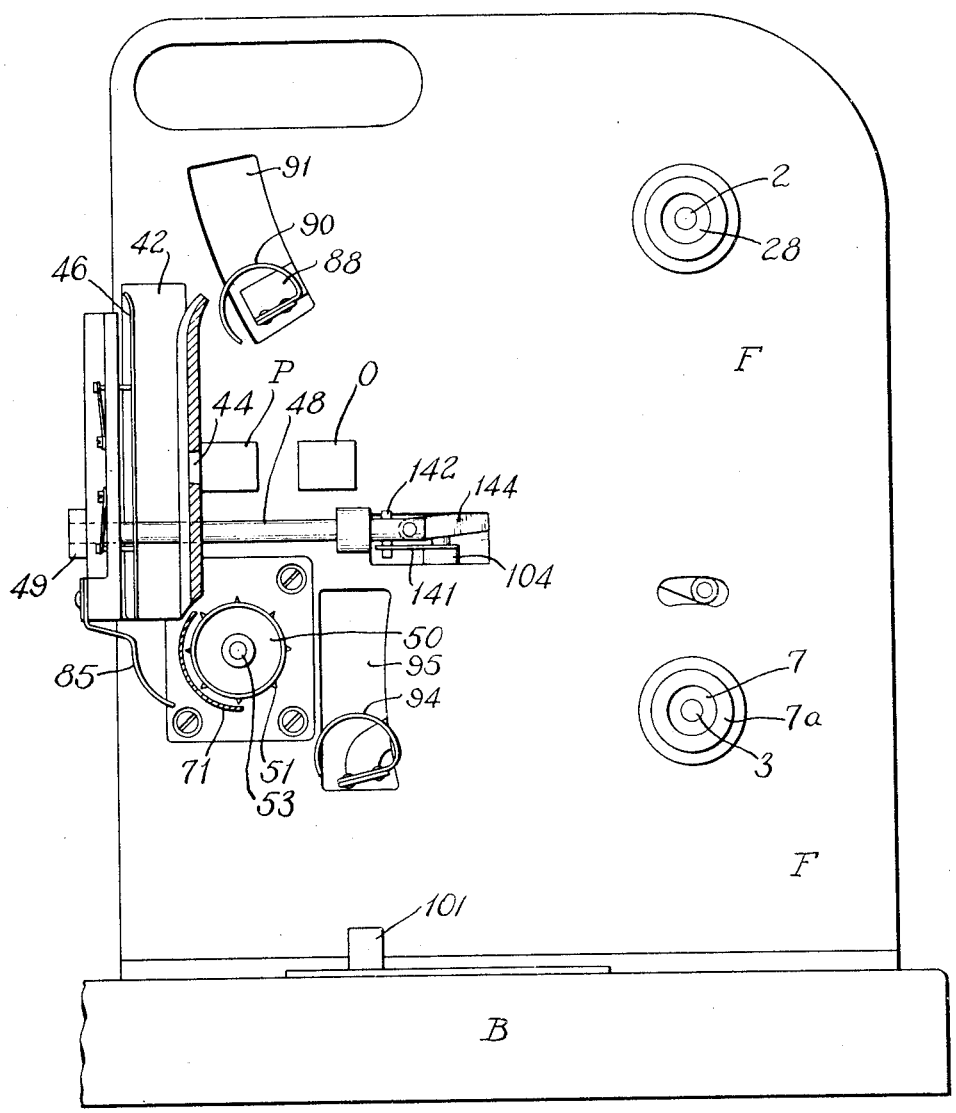
Figure 3 is a partial right-side elevation broken away to show the parts in film-threading position.

Mounted on frame F, and preferably on the front side of the frame, is a fixed gate section 42, preferably secured in any desired manner to the frame F against movement relatively thereto. This section is preferably formed with an aperture 44 through which light may be projected as well understood in the art, and with a film guiding depression extending lengthwise of the section and intersecting the opening 44 for the traveling film. Cooperating with the fixed section 42 is a relatively movable section 46 guided by a pin 47 for the movement from and to said fixed section in parallel relation thereto. Secured to one end of the gate is a gate opening rod 48 slidable through a suitable opening in the gate section 42, and by a boss 49 on frame F is attached to the movable section 46. By reason of this construction it will be apparent that when the rod 48 is moved to the left as viewed in Figure 1 it will be effective for moving the section 46 away from section 42 to the position shown in Figure 3 to permit the removal of the film and the insertion of the new film, while movement in the opposite direction will bring the sections into cooperative relation.

For effecting the desired continuous feeding motion of a film in position in the gate, a sprocket 50 having film engaging teeth 51 adapted to engage the usual apertures in the film is mounted on a shaft 53 extending transversely through frame F and carrying at its opposite end a beveled gear 54, engaging with a beveled gear 55 secured to the horizontal driving shaft 56 which is journaled in a suitable irregularly shaped bearing member 57 carried rearwardly by the frame F. If desired an individual clutch such as described and claimed in my co-pending parent application may be provided for this feeding member. Mounted upon the opposite end of the shaft 56 is a bevel gear 58 which meshes with a bevel gear 59 attached to a shaft 60, one end of which is supported in the bearing bracket 57 and the other end of which is supported in an upper bearing bracket 61. To impart the so-called optical rectification to the continuously moving images upon the film, a rotating drum 62 may be mounted upon a shaft 63, one end of which is supported in a bearing 64 and the other end of which is supported in the bearing bracket 61. To drive this shaft and drum continuously, a bevel gear 65 meshes with a bevel gear 66 which is pinned to the driving shaft 60, this driving shaft 60 in turn being driven through a bevel gear 67 on its lower end, as viewed in Figure 2, which meshes with a bevel gear 68 pinned to the previously described main operating shaft 21. It will thus be understood that when the main clutch is in motion-transmitting position, the sprocket 50 and the optical drum 62 will be jointly and continuously moved.

The optical rectification device which may be employed forms no part whatever of the present invention and may be of any desired type such, for example, as that shown in the patent to Bauersfeld 1,154,835, dated September 28, 1915. All devices for the optical rectification of the image are made necessary by the continuous motion of the film and it is with such continuous film motion rather than with any particular type of optical rectification that the present invention is concerned, and it must be clearly understood that I am in no way limiting myself to any particular form of optical device. Instead of a rotary device, any one of the well known reciprocating devices may be employed, together with whatever shutter devices may be necessary.

Cooperating with the sprocket 50 and normally occupying the position illustrated in Figure 1 of the drawings, is a stripping and protective shield 71 carried by the inner end of a pin 72 supported in a suitable manner by a bearing 73 constituting a part of the fixed gate section 42. Also secured to the shaft 72 is a pinion 74 with which meshes an arcuate rack 75 having a pivotal mounting 76 and operated simultaneously with the operation of a gate rod 48 by means of a pin 77 projecting outwardly as viewed in Figure 1 from the gate opening rod, and engaging a slot 78 formed in the upward extension 79 of the arcuate rack. With the construction just described the movement of the gate opening rod to the left, as viewed in Figure 1, for the purpose of opening the relatively separable gate sections 42 and 44 will effect rotation of the rack in a counter-clockwise direction as viewed in this figure, thereby rotating the shield in a clockwise direction. This rotating movement of the shield will be effective for engaging the film and spacing the film from sprocket 50 preparatory to the removal of the film from the apparatus. It will remain in this position covering certain of the teeth of the sprocket which otherwise would project into the film path during the application of a new film whereby the threading operation of the film is greatly expedited and the film protected during manipulation.

For further assisting the threading movement, the relatively fixed section 42 is provided with a forwardly projecting guide 80 as viewed in Figure 1 having a generally curved contour for gradually feeding the film over the fixed section, the guide having a downwardly curved and inclined lower end 81 for insuring passage of the film over the sprocket and an upwardly inclined and curved upper end 82 for the purpose hereinafter more fully set forth. The frame F also has secured thereto a secondary guide member 83 positioned in spaced relation to the guiding member 80 and adapted to extend substantially in alignment with the inner face of the movable gate section when it has been moved to open position, whereby the film is effectively guided into position between these gate sections. The member 83 has a curved lower end 84 having a function corresponding to that of the curved end 82 of the guide member 80, and described in detail hereinafter. Projecting downwardly from the lower end of the movable gate section is a pair of spaced guide fingers 85 forming a shoe or presser member and curved to generally conform to the curvature of the sprocket 50, the space between these fingers being sufficient to accommodate the teeth 51 of the sprocket, provided a film with central perforations is used. If a film with side perforations is used, an appropriately formed presser member will be employed. These guides cooperate in a manner, as will be readily apparent from the drawings, to permit a film to be positioned between the gate members by merely moving the same laterally relative to its normal direction of travel through the gate. This greatly lessens the time required for threading new film into position, and enables the operation to be performed satisfactorily by an unskilled operator.

In order to provide the uniform movement which is required for the proper operation of the apparatus, and to overcome the otherwise inevitable inequalities of operation of the film, owing to slight irregularities of movement of the film feeding members or otherwise, tension control is applied. This tension control tends to produce a uniform film feed in connection with a continuously operating feeding member. In some of its aspects this tension control feeding as described and claimed herein is an improvement upon the auxiliary feeding mechanisms described and claimed in the co-pending application of Clarkson Ulysses Bundick and Barton Allen Proctor filed July 18, 1925, Serial Number 44,482. In applying the tension control mechanism shown and described in my parent application which in turn refers to said Bundick and Proctor application, I make full use of the various stated different forms thereof. In carrying out the present invention, I may employ tension means which include braking means, or I may omit the braking means altogether, and such tension means, the resilient pressure to which the film is subjected may be of relatively high magnitude, or of relatively low magnitude, or it may combine the two, all as previously set forth in said co-pending applications.

In said Bundick and Proctor application it is stated: "As previously pointed out, the braking function of these auxiliary feeding mechanisms is useful, particularly when abnormal conditions of feeding arise, but it is not necessary to the maintenance of the constant tension of the film . . . above described." It is to be particularly noted that I do not rely upon a braking operation actuated by the tension arms to provide means for compensating for the gradual increase of diameter of the mass of film upon the taking up carrier or the decrease of diameter of the delivery carrier. Such compensation I secure in connection with the taking up carrier by a conventional slip clutch, as shown and described in detail in my parent application.

Figure 2:
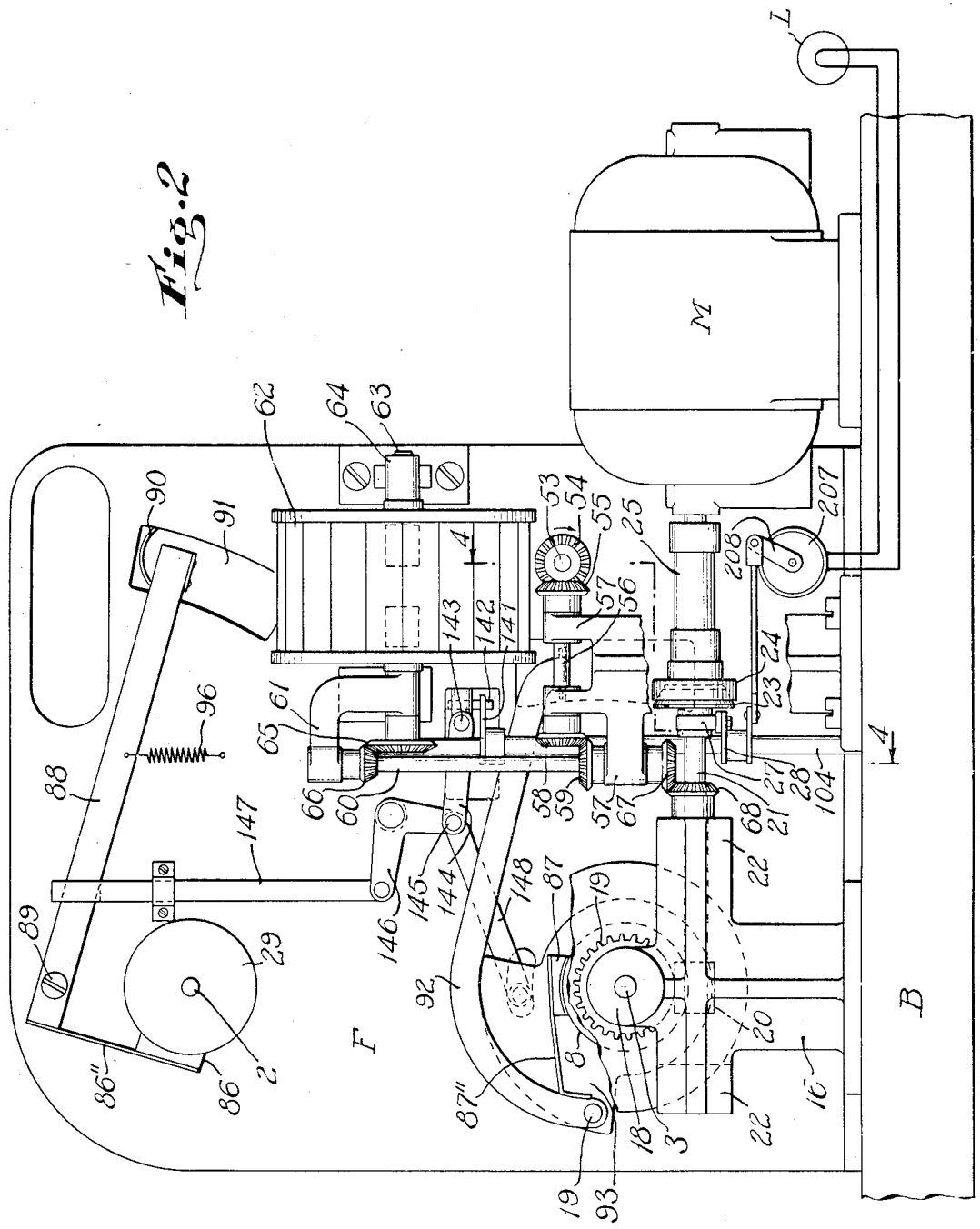
Figure 2 is a left side elevation of the machine.

In Figures 1 and 2 of the drawings I show the tension control as applied with the subsidiary braking mechanism attached as supplementary thereto and in Figure 7 I show a preferred embodiment in which the braking means are completely absent.

As clearly illustrated in Figure 2 of the drawings, the tensioning means may include braking means automatically operated by the film, and including an upper brake 86 cooperating with the brake drum 29 on the rewinding spindle 2 and a lower brake 87 cooperating with the brake drum 8 on the take up spindle 3. The upper brake 86 is carried, preferably by means of a leaf spring 86'', by a lever 88 having a pivotal mounting 89 on frame F at the rear thereof, and having secured to its opposite end a film guide 90 projecting forwardly through a suitable opening 91 in frame F. The lower brake 87 is in turn preferably carried by a curved lever 92 secured to a plate 93 loosely surrounding the boss 7a on the frame F whereby the plate as a unit may be rotated around this boss. At its opposite end the curved lever 92 is provided with a film guide 94 projecting forwardly through a suitable opening 95 in frame F. During the feeding of a film through the apparatus all of the parts occupy the position illustrated in Figure 1 while during the threading of a film into position or its removal from the apparatus the parts occupy the position shown in Figure 3. In this latter position it will be noted that the guide 94 occupies such a position with respect to the curved lower end 84 of the gate guide member 83 as to insure the passage of a film upwardly around the guide 94 automatically upon the lateral movement of the film while the guide 90 occupies such a position with respect to the upwardly inclined curved upper end 82 of the guide member 80 as to insure passage of a film over and around the guide 90 by the operation to which reference has just been made. The lever 88 is normally swung in such direction as to move the brake shoe 86 toward the drum 29 by means of a spring 96. Due to the action of this spring the brake 86 tends normally to prevent each free rotation of the delivery shaft, and thereby prevents the formation of unwanted slack. In the event, however, that the delivery of the film by the spindle 2 tends to lag, the tension of the film causes the lever 88 to move in opposition to the spring 96, thereby relieving the braking action of the brake shoe 86 to a corresponding extent and again producing the desired operating conditions. It will be readily seen, therefore, that this structure tends to insure an even and steady delivery of film from the delivery spindle 2 to the continuous feeding member 50.

The lower brake 87 is normally so positioned as to exert no appreciable braking action on the drum 8. In the event, however, of undue tension on the film as fed by the continuous sprocket 50 toward the carrier upon the driving spindle 3, the film will be effective for swinging the lever 92 in such direction about its pivotal mounting 97 on plate 93 as to bring the brake 87 into more effective braking engagement with the drum 8. The brake 87 may be mounted upon the lever 92 by means of a leaf spring 87". Due to the fact that the spindle 3 is preferably driven from the motor through a friction drive, this braking action will be effective for decreasing the driving force on the take-up spindle 3, and consequently will relieve the tension of the film and produce the desired operating conditions between the sprocket 50 and the lower carrier.

As stated above, the tensioning operation may be entirely independent of the braking operation which has just been described. In such case, the two spring loaded levers subject the film to continuous resilient pressure, such pressure preferably being applied upon each side of the continuous feeding member and in opposition. The power of these levers tends to absorb all irregularities of feeding movement and to insure an even film flow. As will be noted from the drawings, the film tensioning pads 90 and 94 are so disposed in relation to the other film guiding and film supporting members that they form bights in the film upon each side of the continuous feeding member. The snubbing action of the tensioning members within these bights assists in the maintenance of such desired continuous feeding characteristics.

In accomplishing the above results, I may subject the film to relatively great spring pressure or to relatively light pressure, or, preferably in many cases, to a combination of the two. The outer ends of the supports 88 and 92, as taught in said Bundick and Proctor application, may be very yieldingly or very rigidly mounted thereon. Or, the film engaging pads 90 and 94 may be constructed as flat or leaf springs, as taught in the co-pending application of Barton Allen Proctor, Serial Number 332,880, filed January 16, 1929.

In case I employ very resilient tensioning means, the operation thereof may include a movement of the tensioning member which is too fast or far too short a distance to be visible to the eye, or under normal conditions of feeding, there may be no movement at all. In case I employ a relatively rigid tensioning member, I secure a snubbing effect or inertia absorbing effect which is in itself practically constant. In case I mount a resilient film engaging pad upon a spring loaded lever, I secure a combination of the two. One of the very great advantages of the construction which I describe and claim herein is its great and easy adaptability to a variety of conditions and the ease with which it can be modified to secure the desired regularity of feeding in connection with a continuously operating feeding member.

While the apparatus is in the film threading or inoperative position, it is desirable to provide means in the path of travel of the light rays for protecting the film against danger of injury by reason of undue temperature conditions. For effectively shielding the film while the apparatus is in this position, there may be provided a light-reducing or protective shield 98 carried by a shaft 99 having its upper end journaled in a bearing 100 projecting from the frame F and having its lower end suitably journaled in the supporting base B, as will be best seen from Figure 1. It will be readily understood that in the later described application of this invention to a sound producing machine I may take advantage of this construction by making this trap or shield entirely opaque so that the rays of an exciter lamp will be completely cut off from the photoelectric cell. The shaft 99 is adapted to be periodically and intermittently operated in accordance with the character of operation of the apparatus for bringing the shield or mask positively into position except when the film feeding means are in operation and to throw it out of position during the feeding operation.

While the present apparatus is equally well adapted to professional and amateur use, it is provided with means for the automatic operation of all of its operable parts in view of its use by persons who may be unskilled in the art. It is desirable not only to provide automatic control, but also to simplify the control to as great an extent as possible, not only for the purpose of rendering the operation easier, but also for the purpose of reducing the likelihood of error or damage to the film. There is therefore preferably provided a single control member 101 projecting upwardly through an arcuate slot 102 in the supporting base B. This slot may be so shaped as to provide a plurality of operating stations, those which are of immediate pertinence to the present application being designated $S^2$ and $S^3$ respectively. The button 101 is adapted to be moved at will so as to occupy either of these stations either manually or automatically by means of the electrical control mechanism shown and claimed in my co-pending parent application. With the control button at station $S^2$ the gate is closed and the tension controlling arms are in operative relation with the film. With the button in position at station $S^3$, the respective parts of the apparatus are in such position as to permit the positioning of a film therein or the removal of a film which has just been fed therethrough. It will be understood that the movement of the button 101 from station S² to station S³ automatically produces the required change in the operation position of the parts. This provision of a single control, made movable only in a predetermined manner and automatically effective upon such movement for producing all of the necessary changes in operating conditions, constitutes an important feature of the preesnt invention, as it renders the control and operation of the apparatus extremely simple and substantially without likelihood of error.

The control mechanism is to a large extent shown in Figure 5 and Figure 6, Figure 5 illustrating the control mechanism in the operative position and Figure 6 helping such control mechanism in the film-threading position. This control mechanism comprises a lever 103 keyed or otherwise secured to the lower end of a vertical operating control rod 104, having its lower end journaled in any desired manner in the base B and having its upper end suitably journaled in any desired fashion. Being secured to the control rod 104 which is capable only of a turning movement about its horizontal axis, the lever 103 is restricted in its movements to rotation only. Carried by the rotating lever 103 is a combined sliding and rotating lever 106 having adjacent each end a slot 107 through each of which projects a headed pin 108 by means of which the combined sliding and rotating lever is effectively mounted on the rotating lever for additional movement simultaneously therewith and sliding movement independently thereof. At its front end the lever 106 carries an upstanding pin 109 having a head 110 provided with an inwardly projecting pin 110' adapted to engage a bayonet shaped slot 111 in the pin 109. By reason of this construction it will be apparent that the button may be moved vertically on pin 109 by a rotative movement thereof so that it may occupy an upper or lower position on the pin. At its lower end, the pin has a collar 113 of a diameter substantially to conform to the contour of the slot 102 at the respective operating stations whereby with the button in its lower position accidental movement from one of these stations is prevented, while with the button in its upper position the parts are free for movement by the hand of an operator or for automatic operation independently of any operator in the manner described and claimed in my parent application.

The rotation of the operating control rod 104 is effective for opening the gate sections 42 and 44 for moving the tension pads 90 and 94 to inoperative position and for so actuating the protective shield 71 as bodily to remove the film from the sprocket 50 and to shield the sprocket to permit the threading of a new film into position. These operations are secured as follows:

Secured to the vertical operating control arm 104 is an arm 141 which through means of a pin 142 fixed to the gate opening rod 48 opens and closes the gate by the rotation of the operating rod 104. By means of a pin 143 a link 144 is attached to the gate opening rod 48 and its opposite end by means of a pin 145 operates the pivoted bell crank lever 146, the opposite end of which is loosely pinned to the control member 147. The upper end of the member is bent over the top of the tension arm 88. The link 148 is likewise loosely attached by the pin 145 to the link 144 and also through a pin and slot connection to the plate 93.

By reason of the above construction it will be evident that when the previously described control structure is moved from station S² to station S³ the gate will be opened and the link 144 moved to the right as shown in Figure 2. This movement will rock the bell crank 146 about its pivot and pull the upper tension arm 88 and the pad 90 downwardly into the threading position. At the same time this movement will be effective through the arm 148 for moving the plate 93 in a clockwise direction as viewed in Figure 2 thus lowering the take-up tension arm 92 with its pad 94 into the film threading position.

In changing between the threading and operating positions, it is also necessary to move the shield 98 into and out of shielding position. This movement is positively accomplished simultaneously with the rotation of the main control rod 104 through the medium of a rack bar 129 guided as upon headed screws 130 secured in the base B and operating in the appropriate slots in the rack bar. In one end of the rack bar 129 are teeth 131 cooperating with the teeth of a segmental gear 132 attached to and movable with the operating shaft 104. At its opposite end the bar 129 has teeth 134 which cooperate with a pinion 135 fixed to the lower end of the shaft 99. Through the medium of the mechanism just described the movement of the combined rotating and sliding structure from the position indicated as S³ to that indicated as S² will swing the light shield into light passing position. It will be noted that this movement of the light shield takes place positively in timed relation to the movement of the operating parts necessary for the change from film threading to film projecting position.

In order to start and stop the feeding operation concomitantly with the opening and closing of the gate operations the main operating clutch as previously described may be operated by the arm 28, one end of which is fixed for rotation with the main operating control rod 104, and the other end of which is fixed to the collar 27 which operates the motion transmitting cone of the clutch. It will be readily understood that the movement of the operating rod 104 from the station known as S³ to that known as S² will be effective for moving the clutch to motion transmitting position while the contrary movement will have the opposite effect.

By reason of the hereinabove described construction it will be apparent that the movement of the operating button 101 between the stations S³ and S² controls all of the operable parts of the apparatus. With the control button in position at the station S³ all parts of the apparatus are motionless, the feeding teeth are protected, the gate is opened, the light is either extinguished or shielded, and the tension arms are removed from the tensioning or damping position. With the movement of the control button 101 to station S² the film is pressed into operative relation with the feeding sprocket, the gate is closed, the tensioning and damping mechanism becomes effective, the light is rendered effective and the feeding operation is automatically begun. Similarly, at the conclusion of the feeding operation the user may move the control button back to S³ position, thereby stopping the entire operation of the apparatus and placing it in condition for its next use.

If desired, instead of the above mentioned control mechanism a fully developed control mechanism such as that shown in my parent application may be employed. In such case the apparatus would include a still picture projecting position and a rewinding position in addition to these herein described, together with appropriate mechanism operated upon the movement of the control structure to such positions. It will be also understood that if desired the movement of the control mechanism may be accomplished automatically in the manner shown in my copending parent application by means of solenoids shown in Figures 5 and 6. These solenoids may be automatically actuated as described and claimed in my said parent application or may be actuated in accordance with the co-pending application of Earle L. Parmelee, deceased, and myself, Serial Number 105,159, filed April 28, 1926.

It will of course be understood that in the form of the invention shown in Figure 1, the light is passed through a prism or mirror P into the rotating rectifying element 62, and forwardly again at right angles to its initial path through the objective lens O.

In the previously described form of my invention as shown in Figure 1 and those related thereto, I illustrate my invention as applied to a continuously operating sprocket 50. I also show an optical rectifying device, but it will be understood that I may apply that particular form of the invention to any apparatus in which the continuous and controlled feeding of a film or other strip of material is desired. In Figure 7 I show my invention as applied by way of further illustration to the continuous movement of the film through a sound head. An exciter lamp L' passes its beam through the film and upon a photo-electric cell PE, which in turn through various stages of amplification diagrammatically illustrated, operates a loud speaker 149.

In the form of the invention previously illustrated I show the tensioning pads 90 and 94 moved upwardly against the film as viewed in the drawings. In the form of the invention shown in Figure 7, I apply the tensioning pressure of each pad in similar bights of the film, the pressure of one of the pads being directly opposed to that of the other, and the bights being directly opposite each other. For "ironing out" the minor irregularities of film feeding this form of the device under some circumstances is preferable to that previously shown.

A gate as shown in Figure 7 may be in every essential particular identic with that shown in Figure 1, and in the interests of simplicity the reference numerals previously applied to the gate and other parts as described in Figure 1 have been applied to the gate as shown in Figure 7 with a prime character added thereto. The gate opening rod 48' extends above the gate and imparts movement to the movable section 46' which is conveniently extended upwardly to form a convection therewith. Thus it will be seen that movement of the control rod 48' to the left as shown in Figure 7 will be effective for opening the gate and the contrary movement will close the gate.

A sprocket 51' may be operated through a shaft 53' which in all particulars corresponds to the shaft 53 previously described and may be similarly driven. Positioned at the upper portion of the gate is a smooth roller 154, although, if desired, this roller may be omitted and a smooth surface employed.

A stripping and protecting shield may be employed with the sprocket 51' as with the sprocket 51.

Tension controlling members as shown in Figure 7 may be constructed similarly to those shown in the preceding figures. The tension lever 88' pivoted upon a pin 89' may carry at its film engaging end a pad 90', preferably in the form of a leaf spring. As previously noted the braking members are not essential to the operation of the device and in this form of the invention are not shown, although they can be employed if desired.

The take-up tension arm 92' pivoted upon a pin 93' carries at its film engaging end a similar pad 94' preferably in the form of a leaf spring. In this case also, braking apparatus is not shown, although it may be added if desired.

The form of the tension arms shown in Figure 7 for purposes of illustration is such that resilience of different magnitudes is applied to each bight of the film. The film engaging portion of each pad is so positioned in relation to the film that it gives way at the slightest change in tension while the straight or shank position, even though formed as a part of the same leaf spring and of metal of the same thickness and inherent resilience, is so positioned and supported as to give way only under a greater pressure. Thus in effect this construction applies resilience of two differing magnitudes to the film at the same point. If it is desired to supplement this resilience which is the result of the formation of the shank of each leaf spring, I merely strengthen the shank portion by adding another leaf spring thereto as shown in Figure 7. It is, of course, understood that the film engaging portion of each leaf spring is relieved, as by surface grinding, in order not to scratch the film, and this relief tends to decrease the magnitude of that portion of the spring. If desired, however, this resilience can be of a single magnitude, or of relatively great magnitude. If it is desired to supplement this resilience which is the result of the function of the shank of each leaf spring, I merely strengthen the shank portion by adding another leaf spring thereto as illustrated in Figure 7. It is of course understood that the film engaging portion of each leaf spring is relieved, as by surface grinding, in order not to scratch the film, and this relief tends to decrease the magnitude of that portion of the spring.

If desired, both levers 88' and 92' may be spring loaded, thus adding additional resilience to that of the leaf springs 90' and 94', as shown in Figure 1. In most instances, however, with the use of this form of the invention, I prefer to dispense with such additional resilience. The form of the tension arms shown in Figure 7 is such that resilience of different magnitudes is applied to each bight of the film. The film engaging portion of each pad is so positioned in relation to the film that it gives at the slightest change in tension while the straight or shank position, even though formed as a part of the same leaf spring and of metal of the same thickness and inherent resilience, is so positioned and supported as to give only under a greater pressure. Thus in effect this construction applies resilience of two differing magnitudes to the film at the same point.

In addition to the differences in resilience as shown in Figure 7, it will be noted that, as shown by the arrows in that figure, the tensioning movement is in two directions.

Two smooth rollers 90" and 94" may be employed to assist in forming the bights within which the tensioning members operate. The film may pass from a carrier or a continuous sprocket upon the shafts 2' to a similar carrier or sprocket upon the shaft 3'. Alternatively, in connection with an intermittent sprocket, I may resiliently support the conventional loop.

During the feeding of the film by the sprocket 51', the opposed tensioning springs 90' and 94', of any of the previously described construction, tend to absorb in opposition one to the other the slight irregularities of movement which are inevitable in a film handling apparatus, and hence to impart to the film a really continuous kinetic flow. Under ordinary conditions of feeding this resilience will be ample for "ripple killing" purposes, but if desired spring devices may be employed to supplement the resilience inherent in the pads 90' and 94'.

The control of this form of the invention closely follows that of the one previously described. By means of an arm 141' working through a pin 142', the gate opening and gate closing movement is communicated to the gate opening rod 48'. A similar arm 155 through links 156 and 157 with their pin and slot connection rocks an arm 158 from which one control member 159 extends to the tension arm lever 88' and another control link 160 extends to the tension arm 92'. It will thus be evident that when the control rod 104' is rotated from the $S^2$ position as shown in Figure 5 to the $S^3$ position as shown in Figure 6, the pads 90' and 94' will be moved away from each other synchronously with the opening of the gate thus making the removal of the film which has been used or the insertion of a new film an easy matter.

As has been emphasized, throughout this specification, the purpose of the invention is to apply tension controlling means preferably through opposed resilient members, to any continuous film feeding operation.

For purposes of further illustration, in Figure 8 I diagrammatically show my invention as applied to a conventional sound-on-film motion picture projector. The film $f'$ is shown as fed from a delivery carrier 201 by a continuously operating sprocket 202 through a picture gate 203 between which and the continuous delivery sprocket 202 a conventional loop of slack film is employed. To impart the desired intermittent feeding movement to the film, a conventional intermittent sprocket 204 is positioned below the gate together with the usual take-up loop below which is a continuously driven taking up sprocket 205. Therebelow is a sound head comprising any conventional sound gate herein conventionally shown and generically indicated as 206, an exciter lamp 207, and a photo-electric cell PE'. Below the sound head is a sound sprocket 209 to prevent the pull of the take-up reel 210 being communicated to the slit, not shown, of the sound head.

Upon opposite sides of the sound head 206 I show opposed spring pressed tensioning members 211 and 212 which may be constructed in any desired fashion, but preferably as hereinabove shown. For such purposes I may prefer to construct each tensioning member in the form of a spring pressed pivoted lever carrying at one end a resilient film-engaging end. The control of the above operable parts may be as previously described.

Under certain conditions it may be desirable to make and break the circuit of the light source rather than to use the heat shield which has previously been described. Under such circumstances a snap switch 207 operated by an arm 208 may be supplied. Connecting this arm to the main control rod 104 is a link 209 and an arm 210, all as shown in Figure 2. It will thus be understood that the circuit to the lamp L or to the exciter lamp L' as hereinbefore described may be made and broken by the rotation of the control rod 104. It will also be understood that such a switch if desired may be placed in the motor circuit and substituted for the main operating clutch.

Many of the advantages of my invention will be evident from the foregoing portion of this specification, the accompanying drawings, and the subjoined claims. Other advantages arise from the provision of the spring pressed tensioning or "ripple killing" means applicable in connection with the continuous feeding of a ribbon-like material, such as a film, and in the joint control of such means with that of the other operable parts of a material handling or film feeding apparatus.

I have illustrated and described my invention as applied to a motion picture projector but it is to be understood that I am not limited in this respect since my invention is applicable to other forms of photographic apparatus such as, for example, cameras or printers, and to other forms of material handling apparatus.

I claim:

1. In a film handling apparatus having image exposing means, a toothed feeding member for feeding a film past said exposing means, means for continuously driving said feeding member, two oppositely disposed spring irrevoluble loaded tensioning members engaging the film one upon each side of said exposing means so as to form bights of substantial curvature therein, and film contacting and guiding means so disposed in relation to each of said spring loaded members and said feeding member that the film is maintained in oppositely disposed and balanced resiliently supported damped bights of substantial curvature one upon each side of said exposing means.

2. In a film handling apparatus having image exposing means, a toothed rotatable member for advancing a film past said exposing means, means for continuously rotating said film advancing member, means for starting the operation of said continuously rotating means, means for maintaining resiliently supported loops upon each side of said image exposing means, means for rendering said loop supporting means operative upon the film, and control mechanism operatively interconnecting said means for starting the operation of said continuously rotating means and said means for rendering said loop supporting means operative upon the film and effective for concomitantly operating both of said means.

3. In a film handling apparatus, a sound head, means for feeding the film through said sound head, operable means for damping the film in its feeding movement therethrough, means for initially rendering said damping means operative upon the film, an exciter lamp, means for initially rendering said exciter lamp operative upon the film, and control means operatively interconnecting said two last previously mentioned means for concomitantly operating each of the same.

4. In a film handling apparatus having image exposing means, means for moving a film past said image exposing means, a resilient tensioning member engaging the film adjacent said image exposing means, said tensioning member being in the form of a leaf spring with a curved film engaging extremity of relatively large radius and a supporting portion of sufficient length to give to said engaging extremity a degree of resilience different from that of said engaging portion in itself, and film guiding means for maintaining the film in engagement with said relatively large radius of said film engaging portion.

5. In a film handling apparatus having image exposing means, means for moving a film past said image exposing means, a resilient tensioning member engaging the film adjacent said image exposing means, said tensioning member being in the form of a leaf spring with a curved film engaging extremity of relatively large radius and a supporting portion of sufficient length to give to said engaging extremity a degree of resilience different from that of said engaging portion in itself, film guiding means for maintaining the film in engagement with said relatively large radius of said film engaging portion thereby maintaining the film under tension, and means for moving said supporting portion away from the film whereby said tension is released.

6. In a film handling apparatus having image exposing means, means for moving a film past said image exposing means, two spaced and aligned film guiding members engaging the film adjacent said image exposing means, and a resilient tension member engaging the film between said guiding members, said resilient member being in the form of a leaf spring with a curved film engaging extremity of relatively large radius and a supporting portion of sufficient length to give to said engaging extremity a degree of resilience markedly different from that of said engaging portion in itself, and film guiding means for maintaining the film in engagement with said radius of said film engaging portion whereby the film is simultaneously subjected to resilient forces of markedly different characteristics.

7. In a film handling apparatus, image producing means cooperating with the film at a given point, a plurality of film engaging means some of which are fixed and some of which are movable, means for moving said movable film engaging means between a first position wherein they form a path through said apparatus through which a film may be longitudinally fed and a second position wherein they are so disposed that a film may be initially threaded within said apparatus, means cooperating with the film at a given point along the path for producing images therefrom, means for continuously moving the film past said point and bringing successive images thereof into cooperation with said image producing means, and optical means for rectifying the images so produced so that motion pictures result therefrom, said film engaging means including an operable instrumentality engaging the film adjacent said point and effective upon the length of film which passes said point for absorbing minor irregularities of longitudinal movement of the film past said point thereby rendering the motion of the film more uniform and the rectified images more exact, and said means for moving said film engaging and path creating means including instrumentalities for moving said motion modifying means between a threading position wherein the film may be conveniently initially disposed in said apparatus and the projecting position wherein the movement of the film is modified.

8. In a film handling apparatus having means establishing a longitudinal path for the film in said apparatus, image producing means disposed along said path and cooperating with a film at a given point, means for holding the film in the focal plane of said image producing means, means for continuously longitudinally moving the film past said point and into cooperation with said image producing means, optical means for rectifying the image so produced so that motion pictures result therefrom, a spring loaded lever disposed upon each side of said point, and a leaf spring mounted upon each of said levers and engaging the film adjacent said point and continuously and directly affecting the film as it passes said point, said leaf spring being effective for giving a more uniform movement to the film as it moves past said point without materially displacing it from said path and said spring loaded levers being effective for compensating for relatively major disturbances of feeding without interfering with the operation of said leaf springs.

9. In a film handling apparatus having means establishing a longitudinal path for a film, image producing means disposed along said path and cooperating with the film at a given point, means for holding the film in the focal plane of said image producing means, means for longitudinally and continuously moving the film past said point and into cooperation with said image producing means, optical means for rectifying the image so produced so that motion pictures result therefrom, a spring loaded lever disposed adjacent said point, and a leaf spring mounted upon said lever and engaging the film along said longitudinal path adjacent said point and directly affecting the film as it passes said point, said leaf spring being effective for giving a more uniform movement to the film as it moves past said point without materially displacing it from said path and said spring loaded lever being effective for compensating for relatively major disturbances of feeding without interfering with the operation of said leaf spring.

10. In a film handling apparatus having image producing means cooperating with a film at a given point, a delivery carrier and a take-up carrier placed upon opposite sides of said point, means for continuously moving the film past said point and into cooperation with said image producing means, optical means for rectifying the image so produced so that motion pictures result, a brake for at least one of said carriers, a resilient member engaging the film adjacent said point and directly affecting it as it is fed longitudinally therepast, the resilience of said member being effective to absorb minor variations in the flow of the film past said point, a rigid but movable mounting for said member, and a connection between said movable mounting and said brake whereby major movement of said film engaging member under the influence of a major irregularity in movement of the film moves said mounting and operates said brake, the resilience of said member continuing effective upon the film as it passes said point without interruption by the operation of said brake.

11. In a film handling apparatus, an openable gate which when closed holds the film in the focal plane of the apparatus, means for closing said gate, image producing means cooperating with a film while held in said focal plane at said gate, means for continuously feeding the film through said focal plane of said gate and into cooperation with said image producing means, means for rectifying the image so produced so that motion pictures result, operable means engaging the film adjacent said gate for giving greater uniformity of movement to the film at said gate thereby securing greater exactitude in the rectified images, and means operatively interconnecting said gate and said film engaging means for closing said gate and rendering said film engaging means operative upon the film.

12. In a film handling apparatus having image exposing means, a single continuously operating toothed film feeding member for feeding a film past said exposing means, resilient tensioning means continuously engaging the film upon each side of said feeding member, said tensioning means each including a film engaging member of substantial curvature, and guides, said guides and said film engaging members being so disposed in relation to each other and the resilience of said means being such that the film is held in engagement with said substantial curvatures and said resilient means exerts a continuous and balanced resilient pressing and snubbing effect upon the film upon each side of said feeding member as it is moved past said exposing means.

13. In a film handling apparatus having image exposing means, a continuously operating toothed film feeding member for feeding a film past said exposing means, means for pressing the film into operative engagement with the teeth of said member, operating mechanism for moving said pressing means away from said teeth thereby releasing the film therefrom, means for subjecting the film to resilient pressure upon each side of said image exposing means while it is pressed by said pressing means in operative relation with said toothed member, operating mechanism for rendering said resilient pressure means inoperative thereby releasing the film from said pressure, and control means operatively interconnecting said operating mechanisms for actuating both thereof for concomitantly releasing said pressure and moving said pressing means away from said teeth.

14. In a film handling apparatus, a film engaging member having an image exposing aperture, cylindrical film engaging members disposed at each end of said apertured member, guides disposed in spaced relation to said cylindrical members upon the sides thereof relatively remote from said aperture, resilient means for subjecting the film upon each side of said aperture to opposed and balanced tension, said resilient means including two film engaging members of substantial curvature so positioned in relation to said cylindrical members and said guiding means that they engage the film in bights of substantial curvature, and a continuously operating film feeding member for drawing the film along the path formed by said apertured member guides and curved surfaces and past said aperture subject to the tensioning effect of said resiliently supported bights.

15. In a film handling apparatus having image exposing means, a continuously operating toothed film feeding member for advancing a film past said image exposing means, a bodily movable resilient member having a curved film engaging portion of substantial radius disposed upon each side of said image exposing means, guides for the film, said members being bodily movable between a first position in such relation to the film and said guides that said film engaging portions engage the film in bights of substantial curvature thereby forming loops which subject the film to resilient pressure and snubbing effect upon each side of said image exposing means and a second position in such relation to the film and said guides that said film engaging portions have no snubbing or pressure-producing effect upon the film, and means for moving said members between said first and second positions.

16. In a film handling apparatus, an apertured member defining the focal plane of said apparatus, image producing means cooperating with the film while at said focal plane and said apertured member, means for continuously feeding the film in said focal plane past said apertured member and into cooperation with said image producing means, presser means for holding the film against said apertured member during said continuous feeding operation, means for rectifying the images produced from the film at said focal plane so that motion pictures result, operable means engaging the film adjacent said apertured member for giving greater uniformity of movement to the film as it passes the aperture of said member thereby causing greater exactitude in the images so rectified, means for operating said last mentioned film engaging means, and control mechanism operatively interconnecting said presser means and said operating means for moving said presser member concomitantly with the operation of said film engaging means.

17. In a film handling apparatus, an apertured member, image producing means cooperating with the film at the aperture of said member, means for continuously feeding the film past the aperture and into cooperation with said image producing means, means for rectifying the images produced from the film so that motion pictures result therefrom, control mechanism for starting the operation of said rectifying means, ripple-killing means including a member engaging the film adjacent said apertured member for giving greater uniformity of movement to the film as it passes the aperture of said member whereby the images produced by said rectifying means are more exact, control mechanism for initially rendering said ripple-killing means operative upon the film, and means operatively interconnecting said two control mechanisms for operating each thereof concomitantly with the operation of the other thereof.

18. In a film handling apparatus, an apertured member, a source for passing light through the aperture of said member, means for continuously feeding the film past said aperture and through light from said source, control mechanism for rendering said light source operative upon the film at said aperture, means for rectifying the images produced from the film so that motion pictures result therefrom, control mechanism for starting the operation of said rectifying means, ripple-killing means including a member engaging the film adjacent said apertured member for giving greater uniformity of movement to the film as it passes the aperture of said member whereby the images produced by said rectifying means may be more exact, control mechanism for initially rendering said ripple-killing means operative upon the film, and means operatively interconnecting said three control mechanisms for operating each thereof concomitantly with the operation of the others thereof.

19. In a film handling apparatus, an apertured member, a source for passing light through the aperture of said member, means for continuously feeding the film past said aperture and through light from said source, control mechanism for rendering said light source operative upon the film at said aperture, means for rectifying the images produced from the film so that motion pictures result therefrom, control mechanism for starting the operation of said rectifying means, and means operatively interconnecting said control mechanisms for operating each thereof concomitantly with the operation of the other thereof.

20. In a film handling apparatus having a plurality of film-engaging instrumentalities establishing a longitudinal path of travel for a film through said apparatus, image-producing means disposed along said path and cooperating with the film at a given point, means for continuously moving the film longitudinally along said path and past said point and into cooperation with said image-producing means, optical means for rectifying the image so produced so that motion pictures result therefrom, means movable into and from engagement with the film for holding the film in the focal plane of said image-producing means, means movable into and from engagement with the film adjacent said point and effective upon the length of film which passes said point for absorbing minor irregularities of longitudinal movement of the film past said point thereby rendering the motion of the film more uniform, and means operatively interconnecting said holding means and said film motion modifying means for concomitantly operating said holding means and rendering said motion modifying means operative upon the film.

WARREN DUNHAM FOSTER.